US010411976B2

(12) United States Patent
Sharma et al.

(10) Patent No.: US 10,411,976 B2
(45) Date of Patent: Sep. 10, 2019

(54) METHOD AND SYSTEM OF DETECTING A DATA-CENTER BOT INTERACTING WITH A WEB PAGE

(71) Applicants: Praneet Sharma, Lafayette, CA (US); Shailin Dhar, Pleasanton, CA (US)

(72) Inventors: Praneet Sharma, Lafayette, CA (US); Shailin Dhar, Pleasanton, CA (US)

( * ) Notice: Subject to any disclaimer, the term of this patent is extended or adjusted under 35 U.S.C. 154(b) by 109 days.

(21) Appl. No.: 15/669,960

(22) Filed: Aug. 7, 2017

(65) Prior Publication Data

US 2019/0014019 A1 Jan. 10, 2019

Related U.S. Application Data

(60) Provisional application No. 62/529,619, filed on Jul. 7, 2017.

(51) Int. Cl.
| | | |
|---|---|---|
| *H04L 12/26* | (2006.01) | |
| *G06F 21/00* | (2013.01) | |
| *G06F 16/00* | (2019.01) | |
| *G06F 21/31* | (2013.01) | |
| *G06Q 30/02* | (2012.01) | |
| *H04L 29/06* | (2006.01) | |
| *H04L 29/08* | (2006.01) | |

(52) U.S. Cl.
CPC ............. *H04L 43/04* (2013.01); *G06F 16/00* (2019.01); *G06F 21/00* (2013.01); *G06F 21/31* (2013.01); *H04L 43/14* (2013.01); *G06F 2221/2133* (2013.01); *G06Q 30/0277* (2013.01); *H04L 63/1408* (2013.01); *H04L 67/02* (2013.01); *H04L 67/34* (2013.01); *H04L 2463/144* (2013.01)

(58) Field of Classification Search
CPC . H04L 63/1425; H04L 63/1416; H04L 43/04; H04L 43/14; H04L 63/1408; H04L 67/02; H04L 67/34; H04L 2463/144; G06F 21/00; G06F 16/00; G06F 21/31; G06F 2221/2133; G06Q 30/0277
See application file for complete search history.

(56) References Cited

U.S. PATENT DOCUMENTS

| | | | |
|---|---|---|---|
| 9,906,544 B1 * | 2/2018 | Kurupati | H04L 63/1425 |
| 10,007,776 B1 * | 6/2018 | Bailey | G06F 21/36 |
| 2010/0262457 A1 * | 10/2010 | House | G06Q 30/02 |
| | | | 705/7.29 |
| 2016/0359904 A1 * | 12/2016 | Ben Ezra | H04L 63/1483 |
| 2017/0223049 A1 * | 8/2017 | Kuperman | H04L 63/1466 |
| 2018/0288086 A1 * | 10/2018 | Amiri | H04L 63/1425 |

\* cited by examiner

*Primary Examiner* — June Y Sison
*Assistant Examiner* — Steven C Nguyen

(57) ABSTRACT

In one aspect, a computerized method useful for a detecting a data-center bot interacting with a web page includes the step of inserting a code within web page source. The computerized method includes the step of detecting that the web page is visited by a machine, wherein the machine is running a web browser to access the web page. The computerized method includes the step of rendering and loading the web page with the code in the web browser of the machine. The computerized method includes the step of, with the code, creating a hidden canvas element.

7 Claims, 10 Drawing Sheets

METHOD AND SYSTEM OF DETECTING A DATA-CENTER BOT INTERACTING WITH A WEB PAGE

CLAIM OF PRIORITY AND INCORPORATION BY REFERENCE

This application claims priority to U.S. Provisional Application No. 62/529,619, titled and SYSTEM AND METHOD FOR BOT DETECTION ON A WEB PAGE filed on 7 Jul. 2017. This provisional application is incorporated by reference in its entirety.

BACKGROUND

Field of the Invention

This application relates generally to web page management, and more specifically to a system, article of manufacture and method of detecting a data-center bot interacting with a web page.

Description of the Related Art

Web traffic originating from data centers could be bot traffic programmed to masquerade as humans. For example, data-center bots can be used to commit false impression counts for a web page. Advertisers may receive false impression counts and thus be defrauded for advertising payments to a website. Accordingly, improvements to detecting a data-center bot interacting with a web page can be implemented.

BRIEF SUMMARY OF THE INVENTION

In one aspect, a computerized method useful for a detecting a data-center bot interacting with a web page includes the step of inserting a code within web page source. The computerized method includes the step of detecting that the web page is visited by a machine, wherein the machine is running a web browser to access the web page. The computerized method includes the step of rendering and loading the web page with the code in the web browser of the machine. The computerized method includes the step of, with the code, creating a hidden canvas element.

Figure 1:
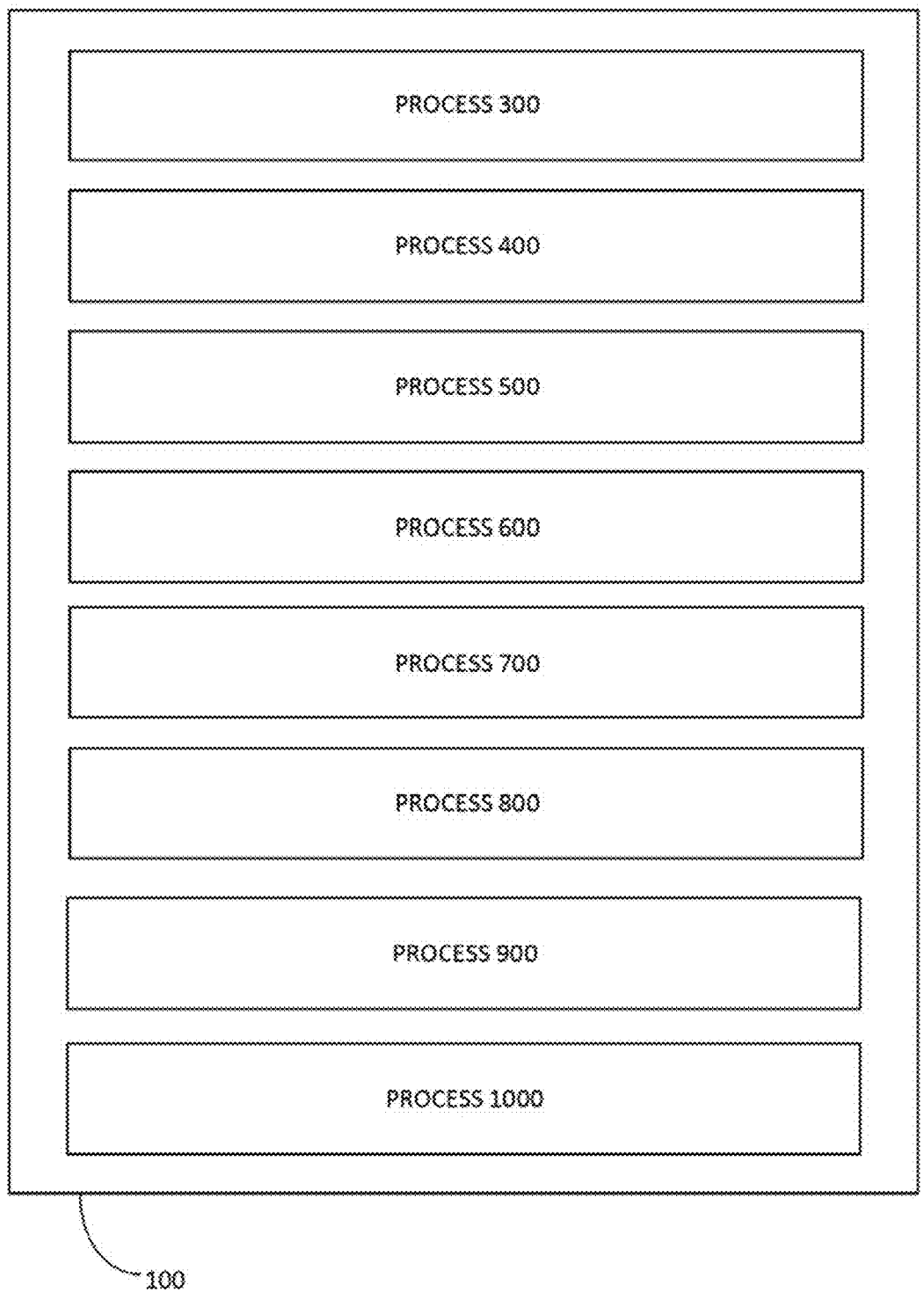
FIG. 1 illustrates an example system detecting a bot accessing a web page, according to some embodiments.

The Figures described above are a representative set, and are not an exhaustive with respect to embodying the invention.

DESCRIPTION

Disclosed are a system, method, and article of manufacture for detecting a data-center bot interacting with a web page. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Bot can be a software agent that visits web pages, such as, inter alia: a social bot, a web crawler, an Internet bot, etc.

Canvas element is part of HTML5 and can allow for dynamic, scriptable rendering of two dimensional (2D) shapes and bitmap images. Canvas element is a low level, procedural model that updates a bitmap and does not have a built-in scene graph.

Graphics processing unit (GPU) can be a specialized electronic circuit designed to rapidly manipulate and alter memory to accelerate the creation of images in a frame buffer intended for output to a display device. GPUs are used in embedded systems, mobile phones, personal computers, workstations, and game consoles.

HTML5 can be a markup language used for structuring and presenting content on the World Wide Web. It is the fifth and current version of the Hypertext Markup Language (HTML) standard.

iframe can allow a visual HTML browser window to be split into segments, each of which can show a different document.

RGBA stands for red green blue alpha.

Script tag (a <script> tag) can be used to define a client-side script (e.g. with JavaScript).

A <script> element can contain scripting statements and/ or point to an external script file through the src attribute (used to identify the location of a resource which relates to an element). Example uses can be image manipulation, form validation, and dynamic changes of content.

Web browser can be a software application for retrieving, presenting and traversing information resources on the World Wide Web.

Example Systems

FIG. 1 illustrates an example system detecting a bot accessing a web page, according to some embodiments. System 100 can include various process, such processes 300-1000. These processes can be implemented by systems 200 and 300 infra. In addition to bot detection with a web page, system 100 can detect bots accessing any web document/application running a web technology such as HTML5, running web documents, executing JavaScript code, etc. System 100 can paste a tag into a web document. The tag can be code. The code can analyze a machine accessing the web document and determine if it a bot. System 100 can flag the machine and/or flag the machine. Other entities can utilize the flag to prevent further access to web documents. System 100 can look for a device marker that indicates that the machine has graphic capability (e.g. see infra). System 100 can use a web-based API to make a call to determine if the machine access the web document includes a graphic processing system. Based on this a value is returned. This value can be based on the type of graphics processing system and/or whether a graphics processing system is extant in the machine. If not, then system 100 can determine that the machine is not operated by a human user but a bot.

Figure 2:
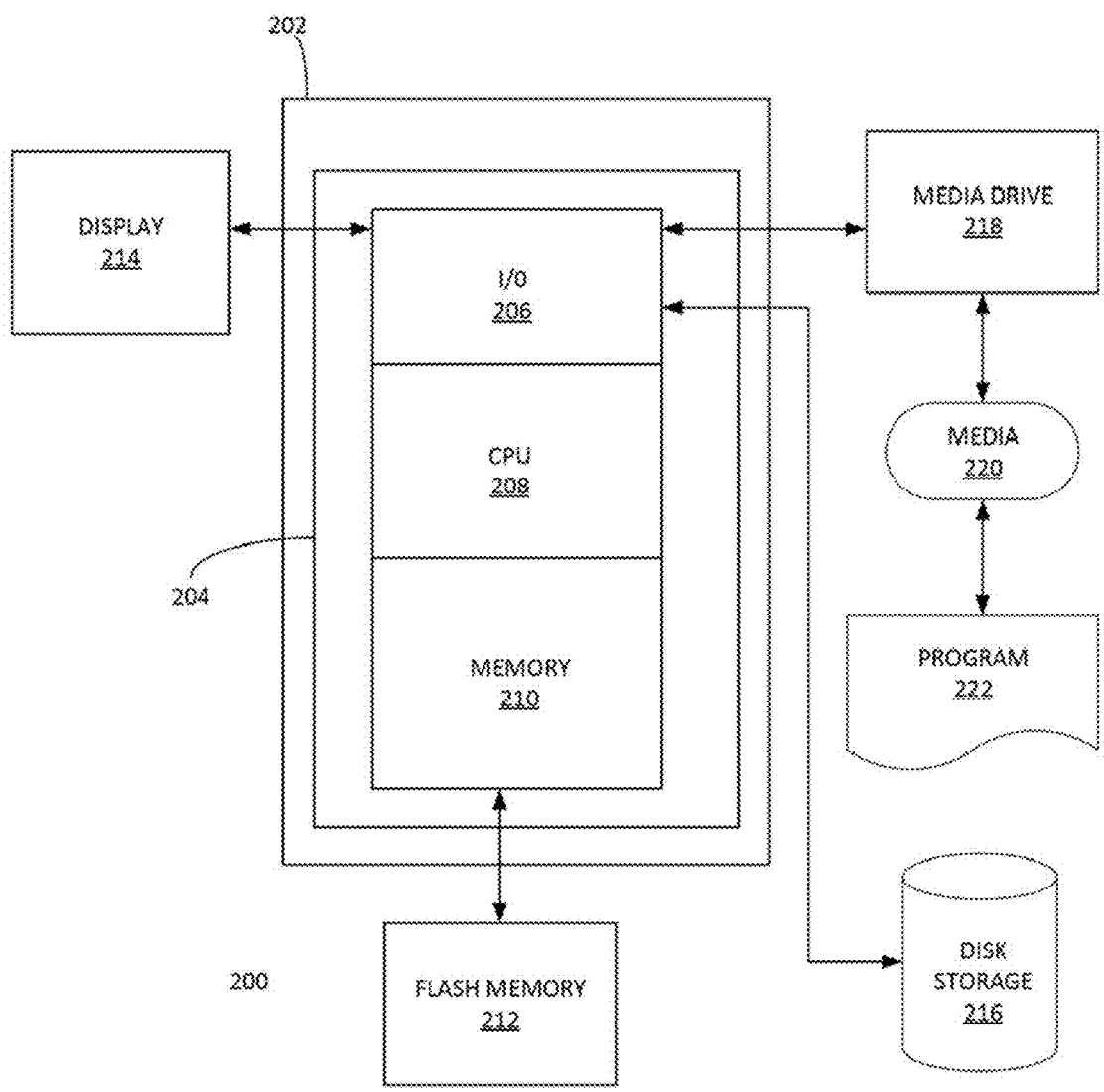
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
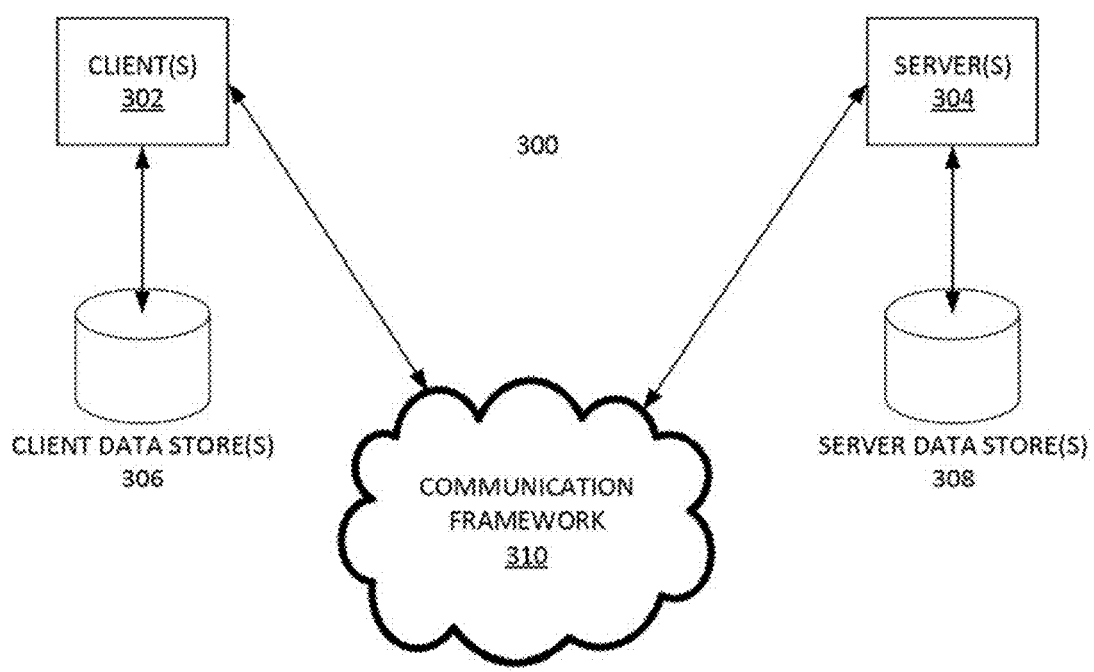
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Example Methods and Processes

Figure 4:
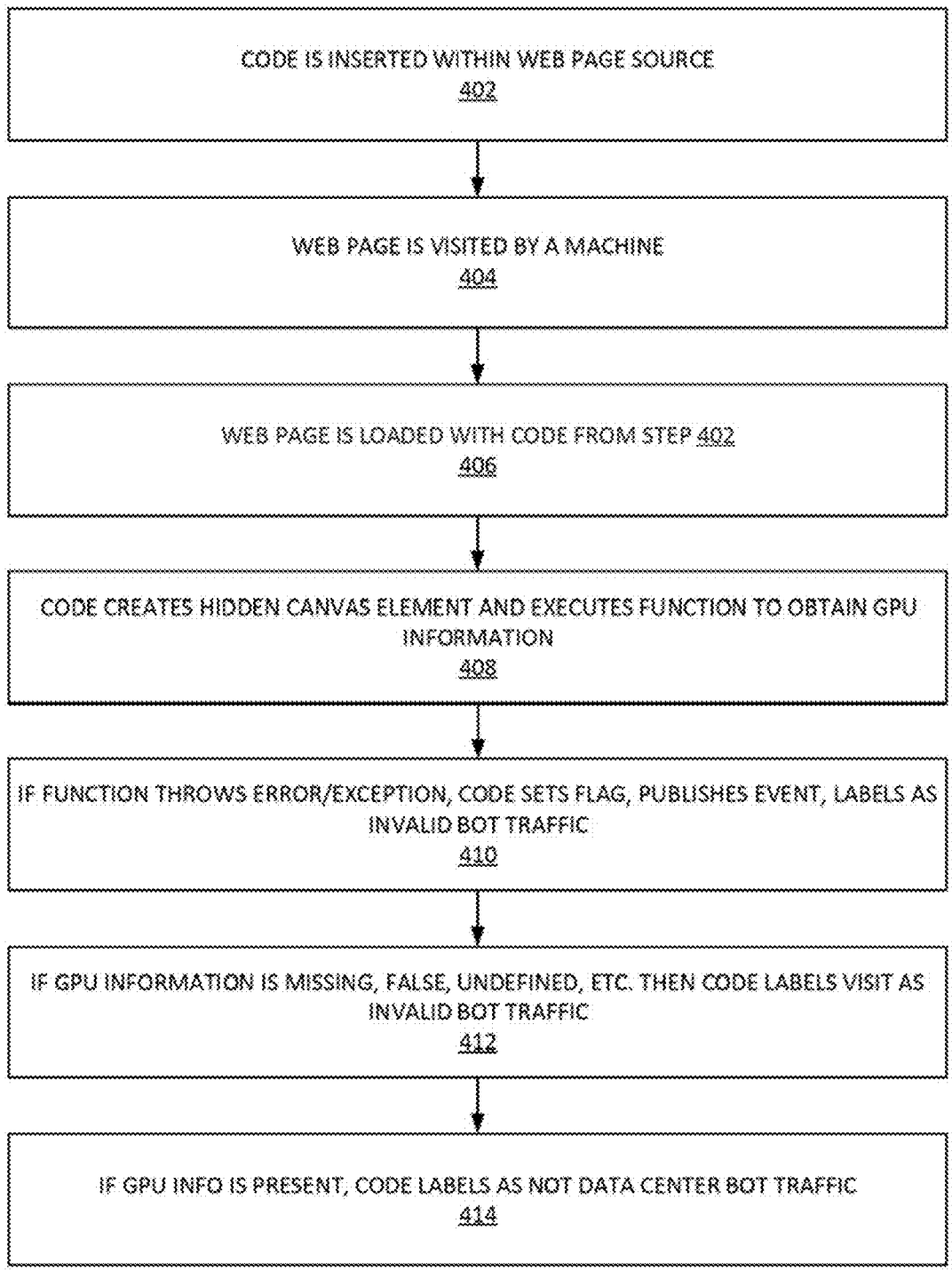
FIG. 4 illustrates an example process for labelling a visit to a web page, according to some embodiments.

FIG. 4 illustrates an example process 400 for labelling a visit to a web page, according to some embodiments. In step 402, the code is inserted within web page source. In step 404, the web page is visited by a machine. A Machine that can run a web browser environment. In step 406, the web page is loaded with code from step 402. In step 408, the code creates a hidden canvas element and executes a function to obtain GPU information of the machine. In step 410, if the function throws error/exception, the code can implement the following steps. It is noted that an HTML <canvas> element can be used to draw graphics, on the fly, via JavaScript. A hidden canvas element is used for the purpose of checking low level properties/capabilities. It is hidden from the user so as to not affect the user experience, or be detected by the user. The code can set a flag. The code can publish an event to other code/libraries to execute further actions. The code can label as invalid bot traffic. In step 412, if the GPU information is missing, false, undefined, etc. then the code labels the visit as invalid bot traffic. In step 414, if the GPU information is present, the code labels the visit as not data-center bot traffic (e.g. web traffic originating from a data center programmed to masquerade as a human, etc.). The code can be a JavaScript code. The web page source can be an HTML5 web page document. The GPU information can include, inter alia: the GPU vendor, type, engine, etc.

Figure 5:
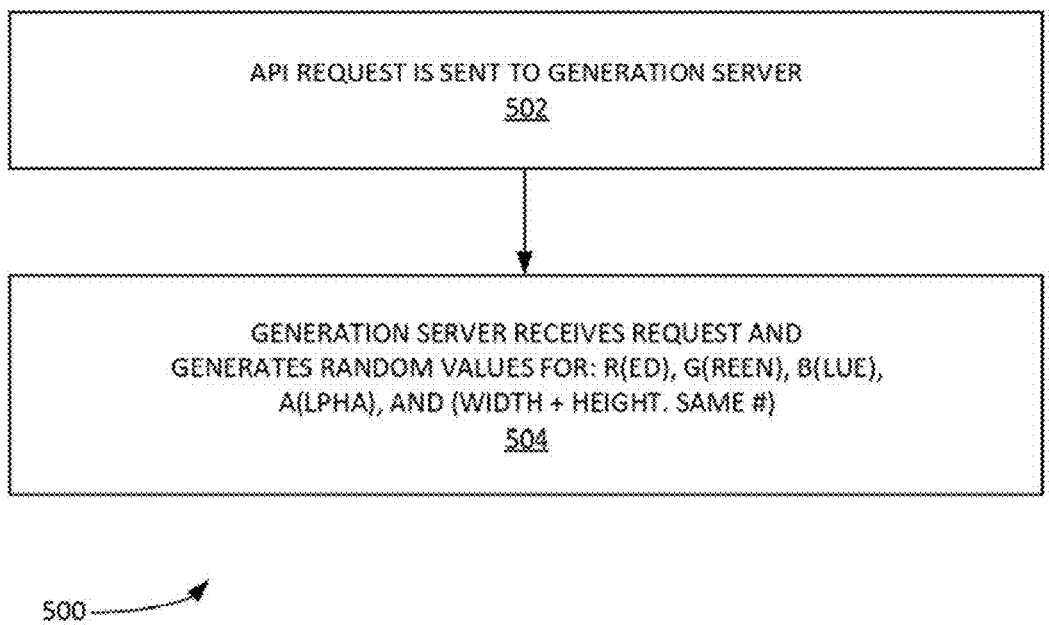
FIG. 5 illustrates an example process for script tag generation via generation server, according to some embodiments.

FIG. 5 illustrates an example process 500 for script tag generation via generation server, according to some embodiments. This further augments the GPU detection methodology by issuing a 'drawing challenge' to the device. The device receives values and must "draw a square" with a specific number of pixels. It is worth noting that only devices with GPUs can be able to do this in a sufficient and quick manner. In step 502, an API request is sent to generation server. In step 504, the generation server receives the request. The generation server then generates random values for: R(ed), G(reen), B(lue), A(lpha), and (Width and Height). The Alpha value can be the alpha compositing value. A generation server can be server environment that can generate specific snippet of 'drawing challenge' code". It is noted that process 500 is this method is optional and can be used in the case a GPU is reported.

Figure 6:
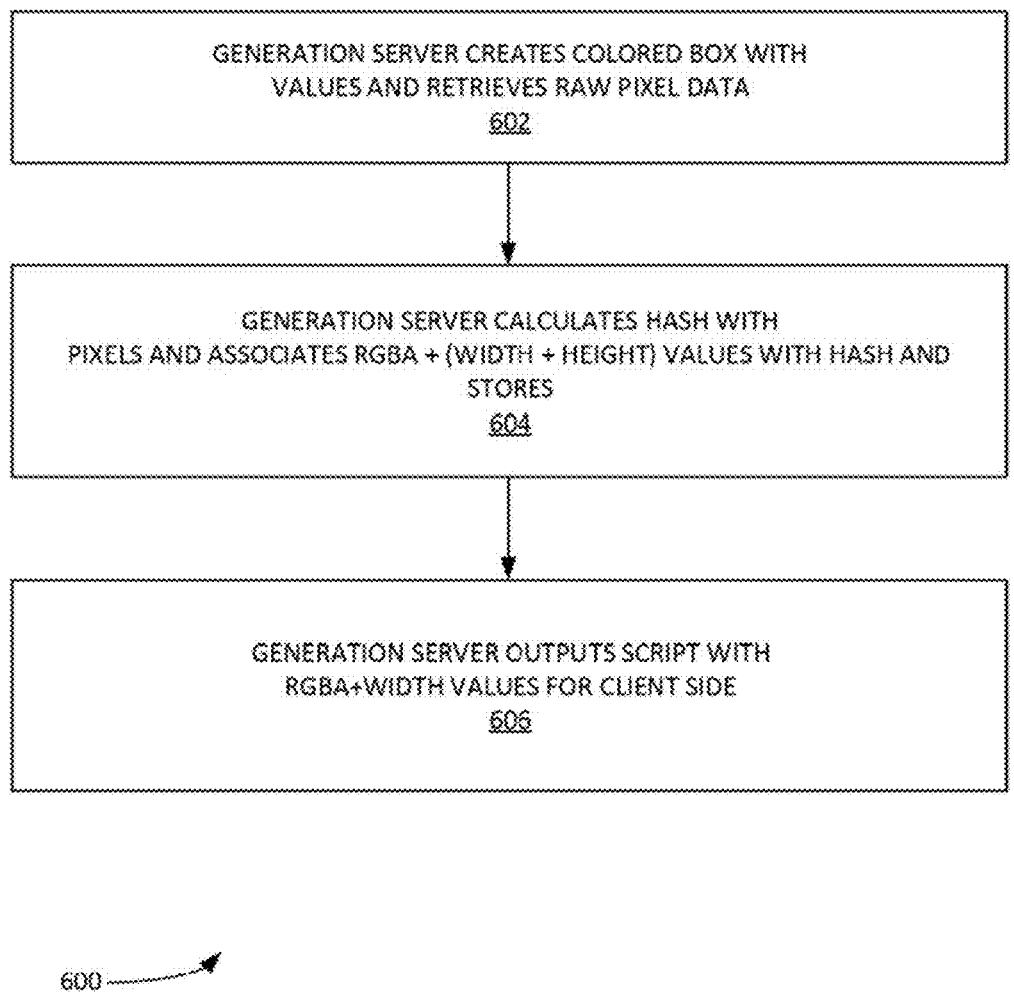
FIG. 6 illustrates script generation for a client side, according to some embodiments.

FIG. 6 illustrates script generation for a client side, according to some embodiments. In step 602, the generation server creates colored box with values and retrieves raw pixel data. In step 604, the generation server calculates hash with pixels and associates RGBA and width/height values with the hash and stores. In step 608, the generation server outputs a script with RGBA and width values for client side. Process 600 can include the 'server side' part of the 'drawing challenge' (e.g. the association of the RGBA+width+height values with a hash to be checked, etc.).

Figure 7:
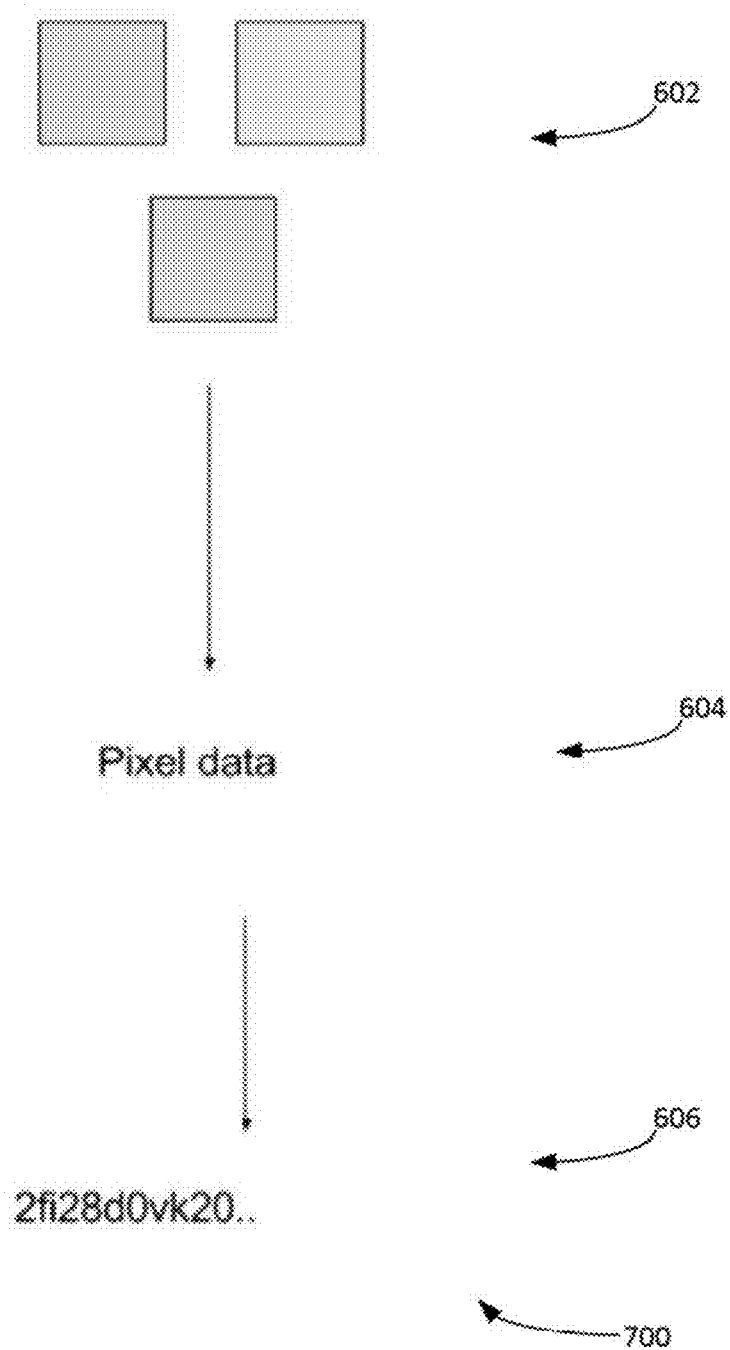
FIG. 7 illustrates a graphical/symbolic represent of the various steps of process 600, according to some embodiments.
Figure 8:
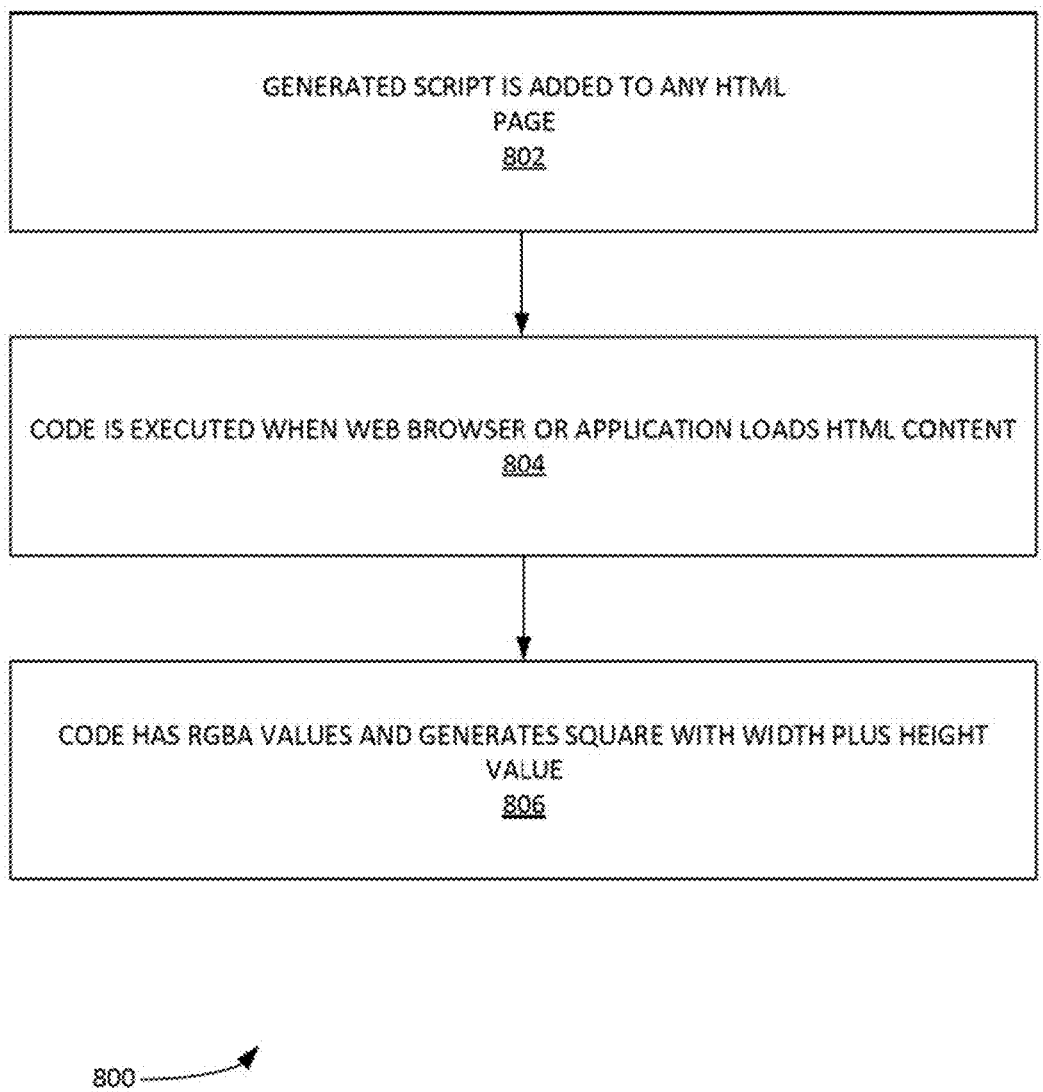
FIG. 8 illustrates an example process, according to some embodiments. In step 802, a generated script is added to any HTML Page.

FIG. 7 illustrates a graphical/symbolic represent of the various steps of process 600, according to some embodiments FIG. 8 illustrates an example process 800, according to some embodiments. In step 802, a generated script is added to any HTML Page. This can be a publisher page or embedded (e.g. an iframe) advertisement creative HTML. In step 804, the code is executed when the web browser and/or application loads the HTML content. In step 806, the code has the relevant RGBA values and then generates a square with a width plus height value. Process 800 can include the 'client side' part of the 'drawing challenge'. The device, if it really does have a GPU, must draw the associated square, get all the pixels and calculate a hash of the pixels.

Figure 9:
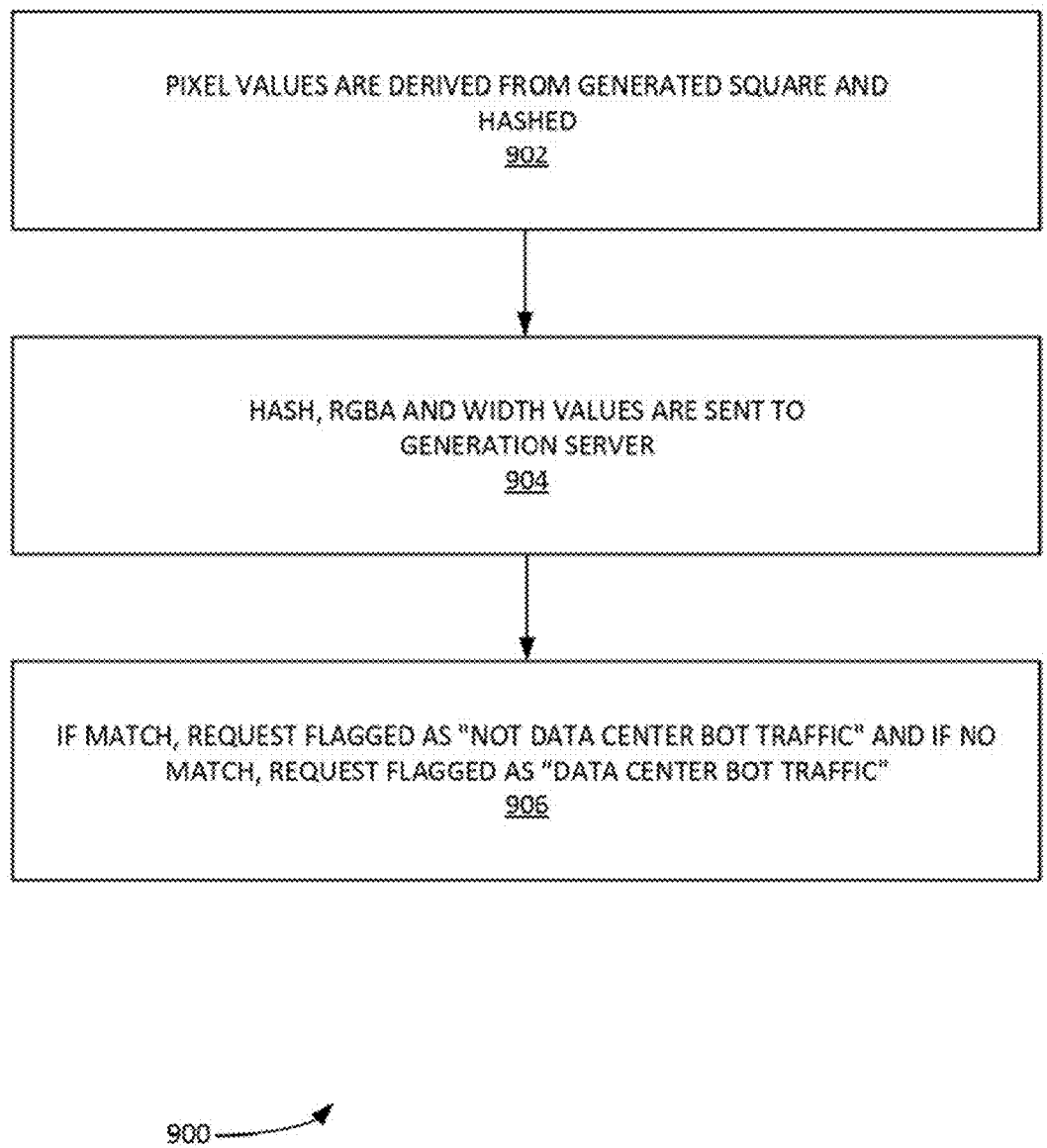
FIG. 9 illustrates an example process, according to some embodiments
Figure 10:
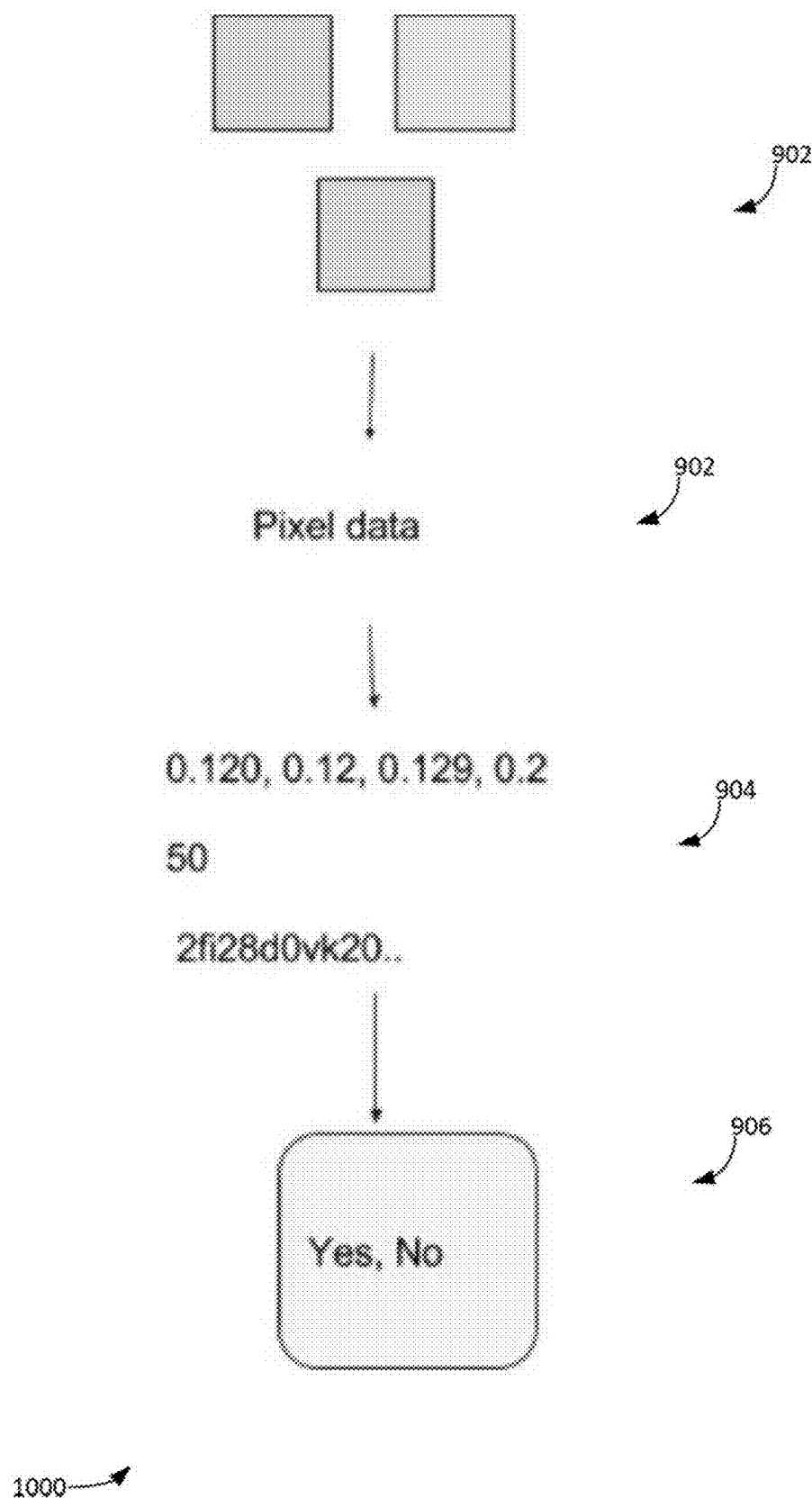
FIG. 10 illustrates a graphical/symbolic represent of the various steps of process 900, according to some embodiments.

FIG. 9 illustrates an example process 900, according to some embodiments. In step 902, pixel values are derived from generated square and hashed. In step 904, Hash, RGBA and width values are sent to generation server. In step 906, if there is a match, the request flagged as "not data center bot traffic". If there is no match, request flagged as "data center bot traffic". Process 900 can be where the client and server come together. The calculated hash and the RGBA+width+height values on the client side are sent to the server and the server must determine if these values all match. If they do match, the device does have a valid GPU. If they don't match, the device is trying to spoof a GPU and is invalid (e.g. labeled as data center bot). FIG. 10 illustrates a graphical/symbolic represent of the various steps of process 900, according to some embodiments.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for a detecting a data-center bot interacting with a web page comprising:
    inserting a code within web page source;
    detecting that the web page is visited by a machine, where in the machine is running a web browser to access the web page;
    rendering and loading the web page with the code in the web browser of the machine; and
    with the code, creating a hidden canvas element;
    with the code, executing a function to obtain a graphic processing unit (GPU) information of the machine, wherein the function returns an error;
    detecting that the GPU information is missing or false based on the return of the function; and
    labeling a visit by the machine as not a visually operated device.

2. The computer method of claim 1, wherein the code comprises a JavaScript code, and where the web page source comprises an HTML5 web page document.

3. A computer system useful for a detecting a data-center bot interacting with a web page comprising:
    a processor;
    a memory containing instructions when executed on the processor, causes the processor to perform operations that:
        insert a code within web page source;
        detect that the web page is visited by a machine, where in the machine is running a web browser to access the web page;
        load the web page with the code in the web browser of the machine; and
        with the code, create a hidden canvas element;
        with the code, executing a function to obtain a graphic processing unit (GPU) information of the machine, wherein the GPU information of the machine indicates a GPU present state or a GPU not-present state of the GPU in the machine;
        detect that that the GPU information is present based on an output of the function used to obtain a GPU information of the machine, wherein the output of the function comprises that the function did not throw an error or an exception; and
        labeling a visit by the machine as a valid visit from the data-center bot.

4. The computer system of claim 3, wherein the code comprises a JavaScript code, and where the web page source comprises an HTML5 web page document.

5. The computer system of claim 3, wherein the code comprises an HTML <canvas> element used to draw graphics via JavaScript.

6. The computer system of claim 3, wherein the GPU information comprises a GPU vendor identifier, with the code, executing a function to obtain a graphic processing unit (GPU) information of the machine to determine if GPU exists, is disabled, or is falsely declared.

7. A computerized method useful for a detecting a datacenter bot interacting with a web page comprising:
  inserting a code within web page source;
  detecting that the web page is visited by a machine, where in the machine is running a web browser to access the web page;
  rendering and loading the web page with the code in the web browser of the machine;
  with the code, creating a hidden canvas element;
  executing a function to request a GPU information of the machine based;
  utilizing the code to determine that the machine has a GPU capability as a binary true state of the machine when the function does not throw an error or an exception or a binary false state of the machine when the function throws an error or an exception;
  for the binary true state, labelling the machine as a visually operated device; and
  for the binary false state, labelling the machine as a not visually operated device.

* * * * *